United States Patent [19]
Sørensen

[11] Patent Number: 5,587,659
[45] Date of Patent: Dec. 24, 1996

[54] TOWABLE ARRAY FOR MEASURING THE RESISTIVITY OF A TERRAIN UTILIZING A LOW POWER LEVEL

[76] Inventor: Kurt I. Sørensen, Blegindvej 102, DK-8362 Hørning, Denmark

[21] Appl. No.: 90,137

[22] PCT Filed: Jan. 23, 1992

[86] PCT No.: PCT/DK92/00023
§ 371 Date: Oct. 27, 1993
§ 102(e) Date: Oct. 27, 1993

[87] PCT Pub. No.: WO92/13286
PCT Pub. Date: Aug. 6, 1992

[30] Foreign Application Priority Data

Jan. 24, 1991 [DK] Denmark ................... 0122/91

[51] Int. Cl.⁶ .................. G01V 3/06; G01V 3/165; G01V 3/15
[52] U.S. Cl. .................. 324/357; 324/360; 324/347
[58] Field of Search .................. 324/347, 357, 324/365, 354, 360, 362

[56] References Cited

U.S. PATENT DOCUMENTS

| | | |
|---|---|---|
| 2,105,247 | 1/1938 | Jakosky . |
| 2,256,742 | 9/1941 | Jakosky ................... 324/347 |
| 2,277,707 | 3/1942 | Lee ................... 324/357 |
| 2,640,097 | 5/1953 | Crumrine . |
| 2,839,721 | 6/1958 | De Witte ................... 324/365 |
| 2,885,633 | 5/1959 | Cook . |
| 3,525,037 | 8/1970 | Maden . |
| 3,646,459 | 2/1972 | Madden et al. ................... 324/354 |
| 3,808,521 | 4/1974 | Pickard et al. . |
| 3,849,722 | 11/1974 | Nilsson ................... 324/357 |
| 4,295,096 | 10/1981 | Sternberg et al. ................... 324/357 |
| 4,296,379 | 10/1981 | Yoshizumi ................... 324/357 |
| 4,446,434 | 5/1984 | Sternberg et al. ................... 324/357 |
| 4,467,283 | 8/1984 | Owen et al. ................... 324/357 |
| 4,535,293 | 8/1985 | Rocroi et al. ................... 324/360 |
| 4,617,518 | 10/1986 | Srnka ................... 324/365 |
| 4,692,908 | 9/1987 | Ekstrom et al. ................... 324/355 |
| 4,942,361 | 7/1990 | Gast et al. ................... 324/360 |

FOREIGN PATENT DOCUMENTS

| | | |
|---|---|---|
| 145671 | 12/1980 | Germany . |
| 2106653 | 4/1983 | United Kingdom . |
| 2132357 | 7/1984 | United Kingdom . |

*Primary Examiner*—Sandra L. O'Shea
*Assistant Examiner*—Roger C. Phillips
*Attorney, Agent, or Firm*—Ladas & Parry

[57] ABSTRACT

The measurement equipment serves to map the subsurface geology in a terrain by means of electrical profiling. A plurality of drag electrodes are used for this purpose, the electrodes with specific mutual spacing, being hooked together with a tow in the form of, e.g., a rope or a wire which is towed by a towing means. An electrical current which is so low as to constitute no danger to operators, is transmitted into the earth through the current electrodes and the voltage is measured across the voltage electrodes. A single-ended electrode amplifier is incorporated into each of the voltage electrodes. The method is useful for rapid and detailed mapping of deposits of natural resources, moist site areas, sand and clay localities in connection with road construction and building land as well as water magazines and refuse dumps.

18 Claims, 4 Drawing Sheets

TOWABLE ARRAY FOR MEASURING THE RESISTIVITY OF A TERRAIN UTILIZING A LOW POWER LEVEL

FIELD OF INVENTION

The invention concerns measuring equipment for mapping the subsurface geology in a terrain by means of electrical profiling, said equipment comprising at least one current circuit for passing a current via current electrodes from a current source through the surface layer to be examined, and at least one voltage circuit with a measuring instrument for measuring, via voltage electrodes, the voltage drop of the current across these.

BACKGROUND OF INVENTION

Electrical profiling of this type has been known for a long time and has been extensively used particularly in recent years as a tool for detailed description of the subsurface geology in connection with e.g. pollution. For this purpose there is usually used an electrode array in a so-called Wenner configuration with four electrodes in the form of earth rods, which are driven down into the earth in a row, with the same mutual spacing and the measuring point defined as the center point of the array. Then a constant electrical current is passed through the earth between the two outermost earth rods, the current electrodes, by means of a current generator, following which the voltage drop of the current across the two central earth rods, the voltage electrodes, is measured. Prior to taking this measurement, the electrochemical surface potentials must have stabilized to a constant value, and this typically takes 20–30 seconds. To balance this residual error contribution two or more measurements are taken in the same electrode array, the current direction being reversed each time, so that the error contribution is substantially balanced owing to the subtraction of the individual measurement results involved by this method. This technique is known e.g. from the patent specifications U.S. Pat. No. 2,640,097 and GB 2 106 653. On the basis of the given current strength, the measured voltage drop across the voltage electrodes and a factor depending solely upon the geometry of the array, the electrical resistance of the earth formation corresponding to a specific focusing depth is finally calculated.

A so-called line profiling is typically used in the taking of the measurements, the measuring configuration being successively moved along a line with the same spacing between the measuring points, and since the electrical resistance is frequently to be registered at several different focusing depths at the same measuring point, the rods are moved symmetrically around this measuring point, and then the measurements are repeated at various rod distances corresponding to the focusing depths to be measured.

When a large number of these line profilings is performed successively, a sum of measurement results can be provided which, in combination, provide a reliable mapping of the electrical resistance of the strata, and thereby give, when interpreted, a satisfactory picture of the geological structure of the area. As will appear, the method is extremely slow and cumbersome, and this applies especially when, as is often the case, it is necessary to examine the formation at several different focusing depths for each individual measuring point, and these are positioned relatively closely to each other for the area to be mapped with a sufficiently high level of detail.

With a view to facilitating this slow and laborious field procedure it has been proposed in U.S. Pat. No. 2,105,247 to use mobile electrodes in the form of e.g. endless tracks on a tractor travelling across the surface of the earth while measurements are continuously taken. In this method it was found necessary to use a relatively great current strength of between 5 and 20 amperes to obtain a voltage signal which was so powerful that it could be distinguished with reasonable certainty from the electrochemical surface voltages which occurred as a consequence of the passage of the voltage electrodes across the varying chemical environment of the surface of the earth. For such a great current strength to be transmitted, the electrode pressure against the earth had to be relatively great to form a sufficiently small transitional resistance between the electrodes and the earth. Thus, electrodes having a weight of between 50 and 100 kg per electrode have been used in practice, and these heavy and unhandy electrodes in connection with the high and dangerous current strengths have entailed that the proposed technique has only been used on a purely experimental basis.

Another form of mobile electrodes is described in the patent specification DD 145 671, the electrodes being constructed as a sort of knives which are secured under their respective carriages which are towed in a row by a towing means, e.g. a vehicle. When the electrodes are constructed as knives, the transitional resistance between the electrodes and the earth is reduced with respect to the method known from the above-mentioned U.S. Pat. No. 2,105,247. On the other hand, such electrodes can be used in practice only in homogeneous, relatively loose stata, because the knives cannot or only with difficulty cut through firm and hard formations, and because they lose contact with the earth or get stuck if they hit a stone. If the voltage signals are to be distinguished with reasonable certainty from the electrochemical voltages in the uppermost stratum using when only the means described in the patent it would also be necessary to use relatively great current strengths which constitute a safety hazard to the operators. Furthermore, the patent does not teach how to solve the above-mentioned problems, and how to make the measurement, and also fails to mention the specific electrical means which are used in the measuring system.

The U.S. Pat. No. 3,808,521 describes an instrument for measuring the electrical earth resistance. Unharmful current strengths below 10 mA are used in this case, so that in the described electrical circuit it is necessary to ensure extremely intimate contact between electrodes and earth to reduce the transitional resistance to such a small size as to provide an even tolerably satisfactory measurement result. Accordingly, this instrument cannot be used in connection with mobile electrodes.

SUMMARY OF INVENTION

The object of the invention is to provide measuring equipment of the type stated in the opening paragraph, which can map the subsurface geology of an earth formation by means of electrical profiling more rapidly and easily than known before and without safety risks to the operators.

The measuring equipment of the invention is novel and unique in that, in combination, the measuring equipment comprises the features that the electrodes are mobile, that the electrodes in a firm configuration are mounted on a tow in the form of a cable or a rope which is towed by a vehicle or other towing means during the profiling operation, that the voltage circuit includes a bandpass filter or the like, that the mobile electrodes are arranged as sliding drag electrodes, and that an electrode amplifier in the form of a single-ended amplifier is provided in each electrode.

The towing means may e.g. be a tractor which simultaneously carries the operator and the necessary electrical apparatus, which is in turn connected to each individual electrode by means of insulated wires which are run along the tow. In this manner the operator can easily and quickly and with desired density, e.g. continuously, perform the measurements, since he just has to steer the tractor through the terrain with the electrodes dragged along like a long tail following the irregularities of the terrain.

In the field work, where it may e.g. be necessary to lift one or more electrodes over an obstacle, the operators can freely handle and work with the equipment without any risk of being subjected to hazardous or fatal shocks, which may be dangerous in particular when, as is typically the case, AC current is used with a frequency in the range between 10 and 100 Hz. The threshold limit, when a person is no longer capable of releasing a current-carrying part himself at these frequencies, is far below the 5–20 amperes which were used in the equipment described in the above-mentioned U.S. Pat. No. 2,105,247. The size of the threshold limit is as low as about 10 milliamperes and can only give a quite weak voltage signal which, other things being equal, is therefore easily drowned by the electrochemical surface voltages. However, these voltages will substantially be eliminated from the complete signal by means of the bandpass filter in the voltage circuit, so that it is only the voltage signal referring to the geological structure in question that is registered. The actual current limitation can advantageously take place by arranging the current source as a constant current generator.

Thus, the operating staff can handle the current carrying electrodes without risk, each of which preferably has a weight of between 10 and 15 kg and can therefore easily be lifted by a single person who alone can therefore operate the complete arrangement, it having been necessary in the past to have at least three persons doing the job. If desired, the electrode may also have a greater weight of e.g. up to 100 kg, and the handling of them may then advantageously take place by machine.

When the geology is to be examined at several different depths, several electrode configurations may advantageously be provided on the same tow to increase the measuring rate, and additionally several parallel tows may be towed simultaneously by means of a beam, it being thereby possible to cover a complete band of the surface of the earth which is to be measured.

As mentioned before, the various electrical wires from the electrical apparatus on the towing means are run to each individual electrode along the tow. This parallel wire layout entails in operation that inductive and capacitive cross talk occurs from the current conductors to the voltage or signal conductors and capacitive cross talk between the signal conductors. The consequent noise signals are compensated according to the invention by mounting in each electrode an electrode amplifier in the form of a single-ended amplifier, which typically amplifies the electrode signal by a factor of 10–50. The amplifier is moreover provided with a low output impedance causing a reduction of the capacitive cross talk to the signal conductors, and since the signals have now been greatly amplified, the interference from the inductive cross talk from the current conductors to the signal conductors will likewise be reduced to a size which is without practical importance.

BRIEF DESCRIPTION OF THE DRAWING

The invention will be explained more fully by the following description of embodiments which just serve as examples, with reference to the drawing, in which.

DETAILED DESCRIPTION

Figure 1:
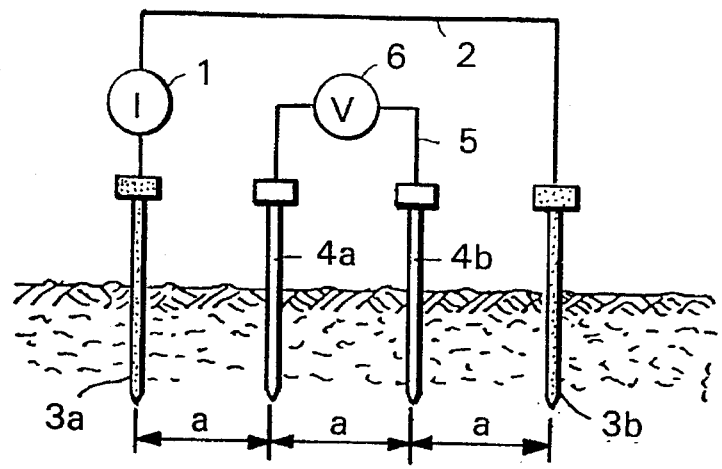
FIG. 1 shows conventional measuring equipment for electrical profiling with four earth rods arranged in a Wenner configuration, FIG. 2 schematically shows a first embodiment of an array according to the invention with four drag electrodes towed by a tractor by means of a tow.

The theoretical background of the electrical profiling technique may be illustrated by means of FIG. 1, which shows a conventional Wenner configuration with four earth rods which are driven 10–30 cm down into the earth with a mutual distance a, or so far as to ensure reliable galvanic contact with it. By means of a current generator 1 and an electric wire 2, current I is passed into the formation via the two outermost earth rods 3a, 3b, the current electrodes, which are marked is black, and the voltage drop dV across the two central earth rods 4a, 4b, which are connected with an electric wire 5, is measured by means of a voltmeter 6. On the basis of I and dV the apparent resistance of the formation can now be calculated as follows:

$$Rhoa = K(a)dV/I$$

where K(a) is a geometrical factor which depends solely upon the distance a between the electrode rods.

This distance a may e.g. be 5 m, whereby the measurements will refer to a corresponding focusing depth in the center point of the array. Usually, it is desired to obtain knowledge of the geological conditions at several depths, and for this purpose the rods are then moved symmetrically outwardly about the same center point to a rod distance of e.g. 15 m, and then the measurements are repeated. Since the current now penetrates deeper down into the formation, the measurements will now refer to a correspondingly greater focusing depth. This process can then be repeated a desired number of times until a satisfactory level of detail has been obtained in this measuring point, following which the positions of the rods are moved a suitable distance, and the entire operation is repeated. Extremely precise information on the nature of the formation can be obtained by means of this method, but the work is extremely slow and cumbersome and usually requires a team of three persons.

Figure 2:
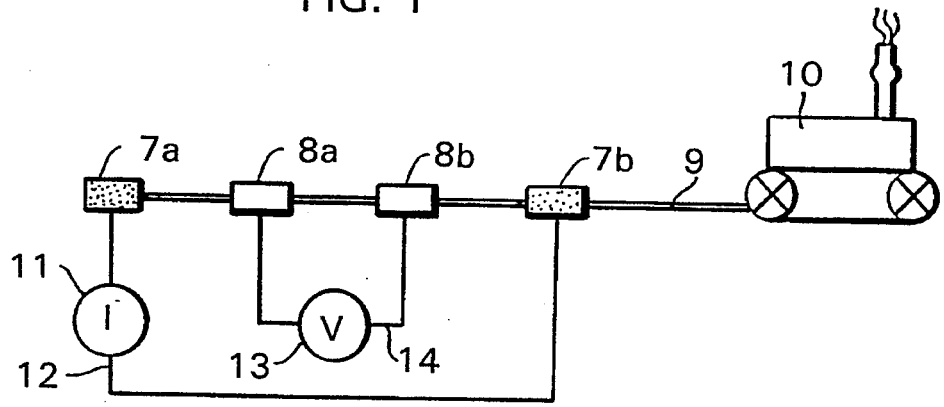

In FIG. 2 the rods are replaced by drag electrodes 7a, 7b for the current and drag electrodes 8a, 8b for the voltage. These drag electrodes are hooked on a tow 9 in the form of e.g. a $10^\emptyset$ rope of the Kevlar type, which is not electrically conducting and moreover has a breaking strength sufficiently high for the purpose. In the shown case the tow is towed through the terrain by means of a tractor 10, but it is possible to use any other towing means, e.g. a horse. As in the conventional method described above in connection with FIG. 1, current I is passed out through the outermost current electrodes 7a, 7b by means of a current generator 11 and an electric wire 12, while the voltage drop dv is measured across the two central voltage electrodes 8a, 8b by means of a voltmeter 13 in an electric wire 14. The measurements can now be made currently and at a great speed by means of this equipment during the travel of the tractor, and the necessary team is just a single person.

For equipment of this type to be useful in practice, the electrodes must be so light that they can be lifted and moved without difficulty by a single person, and therefore they should preferably not weigh more than 10–15 kg each. This entails that each individual electrode forms a relatively weak contact pressure against the earth, and that the current encounters a correspondingly great electrical resistance at this point. To this should be added that the current must necessarily be limited to quite a small size so that at the usually employed frequencies of between 10 and 100 Hz the current involves no danger for persons who might contact current carrying parts of the equipment, which frequently takes place when the operator is e.g. to lift an electrode over an obstacle in the terrain. Thus, the International Electronic Commission report of 1984 on the effect of the passage of electrical current through the human body at frequencies of between 15 and 100 Hz states an upper threshold limit of 10 milliamperes for the current strength which still allows a person to release a stripped current conducting object.

For safety reasons, the current circuit in the measuring equipment of the invention therefore includes means for limiting the current strength to a level which is below the above-mentioned threshold limit of 10 milliamperes or another safety level that might be fixed by the authorities. Therefore, in contrast to the previously mentioned older U.S. Pat. No. 2,105,247 which describes equipment with heavy electrodes and great current strengths, the measuring equipment of the invention can now be operated easily and without difficulty by a single person, who can freely touch and move the light current conducting electrodes without any risk of being injured by the electrical current.

The highly limited current strength in connection with the highly increased electrical transitional resistance between the electrodes and the earth with respect to the prior art entail on the other hand that the voltage drop across the voltage electrodes or the signal to be registered is extremely weak and is therefore difficult to distinguish from the inevitable noise signals, which are caused by the highly varying electrochemical surface potentials on the voltage electrodes, and which may typically be of the same order as the signal generated by the transmitted current or even be greater than this.

Figure 7:
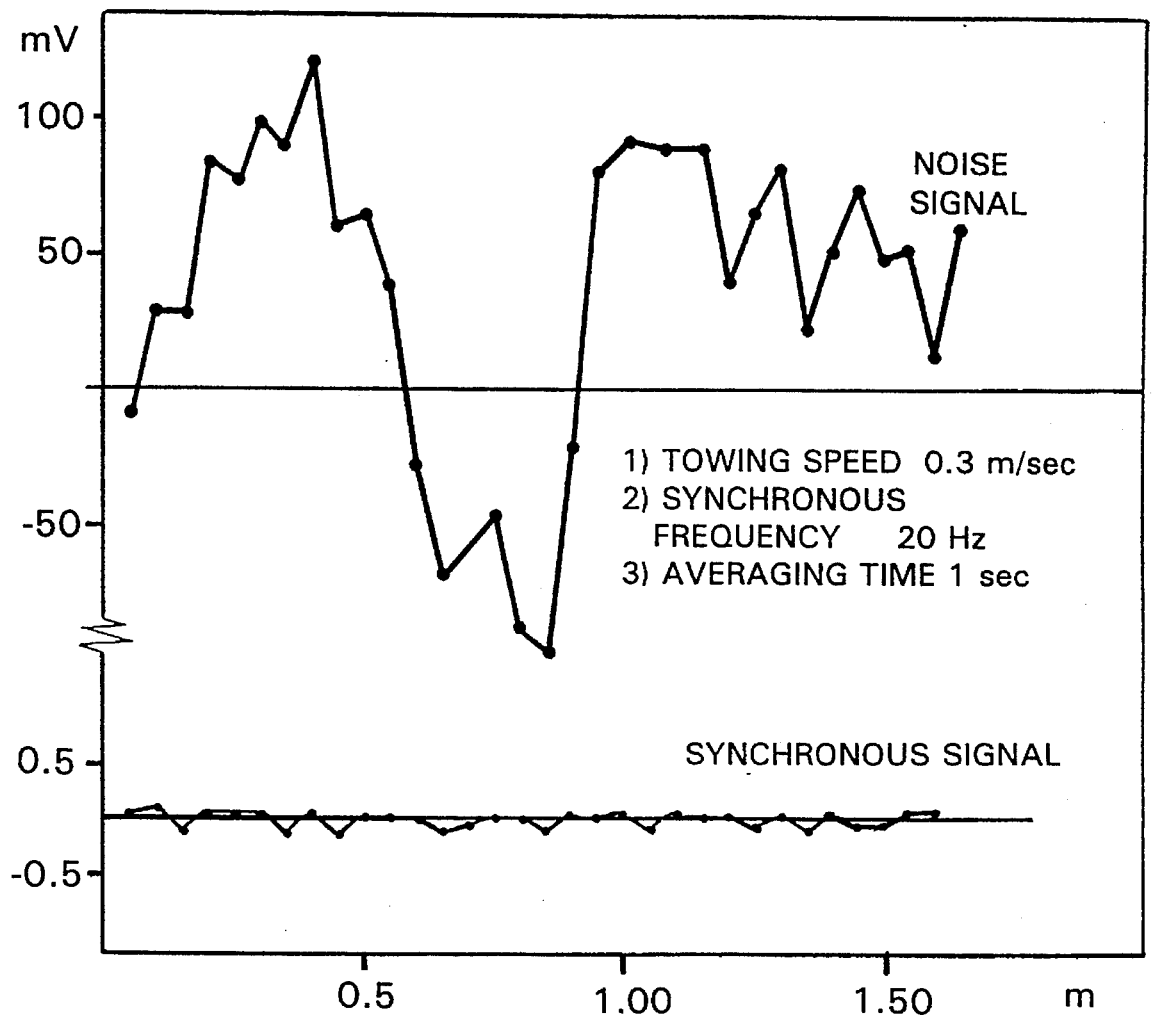
FIG. 7 is a diagram showing the variation of the electrode voltages during towing, and how the resulting noise component is reduced by means of a synchronous detection technique.

For the desired signal to be separately registered, the voltage circuit in the measuring equipment of the invention therefore has inserted in it a bandpass filter which operates by means of a pickup technique comprising transmitting a low frequency pulse train with e.g. a frequency of between 10 and 30 Hz by reversing currents and measuring the voltage across the voltage electrodes in synchronism with this pulse train. The individual voltage measurements are then added/subtracted in the special electronic circuits in phase with the transmitted current, to provide an output signal by means of a suitable averaging time (1–5 sec), where the interference from the noise signals are reduced to a negligible level. The employed technique, which is called phase synchronous detection technique by those skilled in the art, is known per se and will therefore not be mentioned in greater detail here. The surprisingly good result achieved by using the technique in connection with light drag electrodes and unharmful small current strengths appears clearly from the diagram in FIG. 7, which shows the noise signal and the synchronous signal, respectively, in a test performed in practice where the electrodes were towed across the ground at a speed of 0.2 m/sec, the synchronous frequency being 20 Hz and the averaging time 1 sec.

In the measuring equipment shown in FIG. 2 the electric wires 12, 14 are plotted for clarity as if they were free with respect to the tow 9. However, in the practical embodiment all instruments are expediently placed on the tractor 10, and both the current wires 12 and the voltage wires 14 are run from the tractor out to the electrodes along the tow. The wires will hereby be positioned close to each other, so that inductive and capacitive cross talk occurs from current conductor to signal conductor and capacitive cross talk between the signal conductors.

This cross talk adds to the interference with the desired signal at significant noise signals which, however, are compensated according to the invention by positioning in each individual electrode an electrode amplifier in the form of a single-ended amplifier with reference to a common terminal (earth terminal) which is run to all voltage electrodes. Any desired voltage difference between the individual electrodes can hereby be measured. The electrode signal is typically amplified 10–50 times by means of the amplifier, which is moreover provided with a low output impedance causing the capacitive cross talk to the signal conductors to be reduced, and since the signals are now greatly amplified, interference from the inductive cross talk from the current cables will likewise be reduced to a size which has no practical importance.

Figure 3:
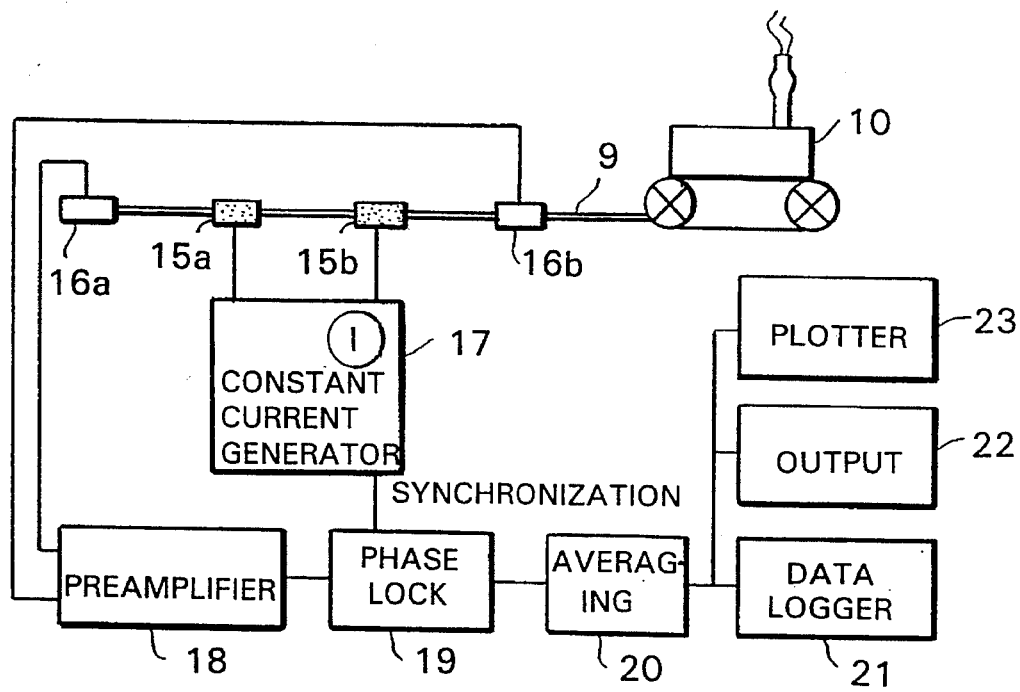
FIG. 3 shows the same, but in another embodiment.

FIG. 3 schematically shows a further development of the embodiment shown in FIG. 2, which is now provided with the above-mentioned electronic means for compensating or eliminating the noise signals, as well as with equipment for measuring and recalling the various data to be collected.

In this case the electrodes are arranged in a Wenner configuration with the current electrodes 15a, 15b in the center and the voltage electrodes 16a, 16b arranged one on each side of the current electrodes, and the complete measuring setup is shown as a block diagram. Current limitation takes place in the example shown by using a constant current generator 17, which is so adapted as to maintain a constant current, which is preferably an AC current, within the maximum level prescribed for safety reasons. The voltage signal amplified in the electrode amplifiers is additionally amplified by a preamplifier 18, and the portion in phase with the pulse train from the generator 17 is selected in the phase lock 19 which, together with the averaging circuit 20 constitutes a bandpass filter. The signal from the averaging circuit 20 is entered into a data logger 21 which receives a datum at suitable intervals, e.g. 1–5 sec, under the control of pulses from a counting wheel (not shown) and the operator. The apparatus moreover comprises an output unit 22 and a plotter 23 for plotting continuous profiles with marking of the travelled distances measured by the counting wheel.

Figure 4:
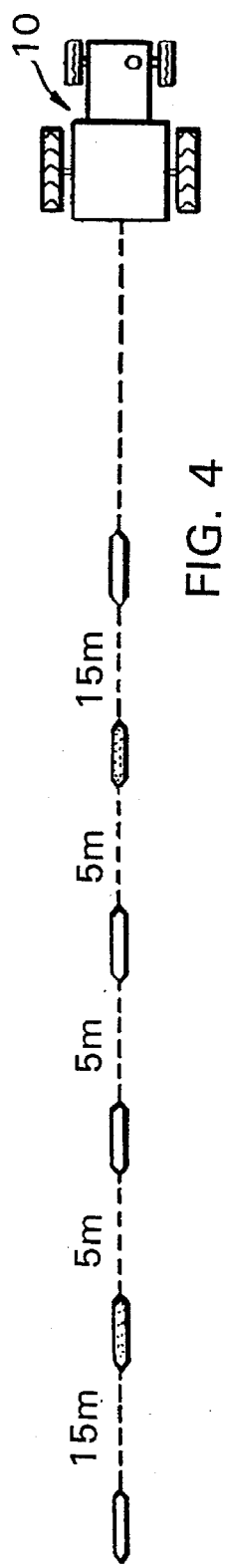
FIG. 4 shows a tow with two current electrodes and four voltage electrodes.
Figure 5:
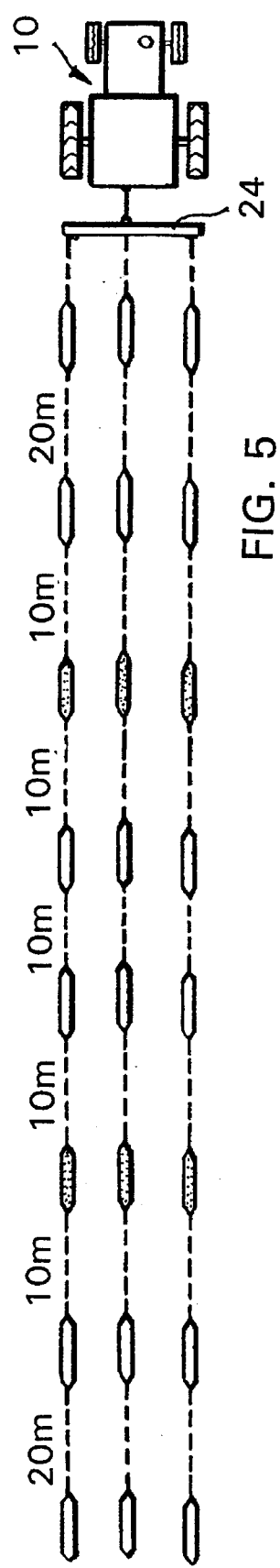
FIG. 5 shows three parallel tows on a beam, each having two current electrodes and six voltage electrodes.

While the measuring equipment shown in FIGS. 2 and 3 just comprises a single electrode configuration, the same tow as shown in FIGS. 4 and 5 may readily comprise several electrode configurations. In this case too the current electrodes are marked in black, and the actual tow is drawn in broken line to indicate that the electrode distance is not equidistant, but may be suitably varied to form the desired configurations. FIGS. 4 and 5 show some electrode distances which have been found in practice to form expedient configurations. In the tow of six electrodes shown in FIG. 4, two configurations are thus formed, and three configurations are formed in the tow of eight electrodes shown in FIG. 5.

Profiling data from several electrode distances and thereby more penetration depths may be obtained simultaneously in the same towing operation by means of the above-mentioned arrangement with several electrode configurations. The electrodes are then positioned in the tow so as to give the same horizontal focusing. The sampling rate, i.e. the number of measuring operations which can be performed per unit of time, can hereby be increased additionally to a considerable extent with respect to the conventionally employed technique. By means of a bar 24 the tractor 10 can moreover tow several parallel tows such that a complete band of the surface of the earth is covered in the form of a band profiling.

The sampling rate can be increased by the number of employed parallel tows by means of the last-mentioned method, but the additional advantage is achieved that cross correlations capable of revealing resistance strikes in the terrain can be provided between the resistance profiles of the individual tows. Furthermore, the geological noise caused by subsurface inhomogeneities can be reduced by correlation between the individual tow profiles.

Figure 6:
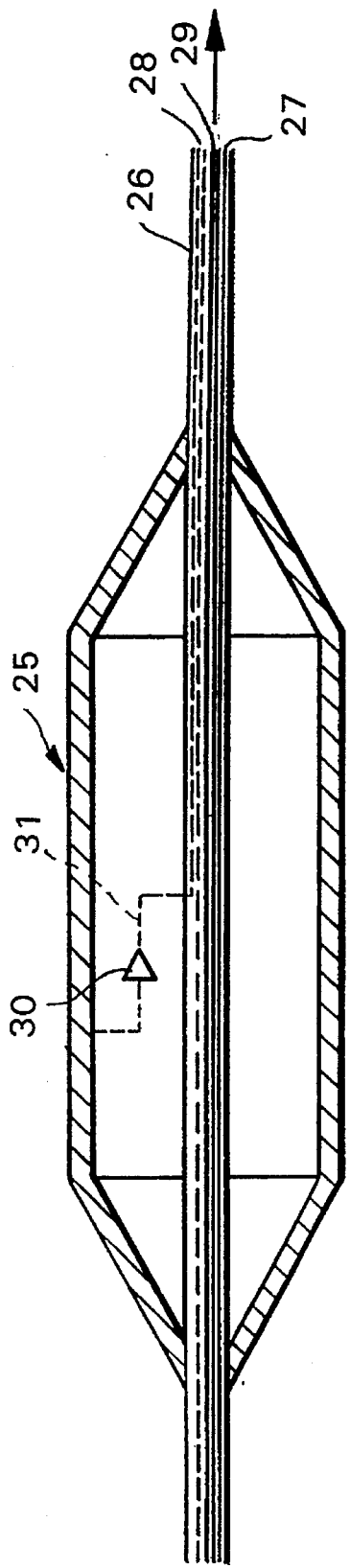
FIG. 6 shows an enlarged view of an embodiment of a drag electrode according to the invention.

FIG. 6 shows an expedient embodiment of an electrode 25. The electrode, which is preferably made of metal, such as iron, is shown to be hollow and tapers conically or like a torpedo toward both ends to offer as little resistance as possible to obstacles, if any, which the electrode might encounter when being towed through the terrain. Longitudinally through the electrode are provided a wear-resistant hose 26 surrounding the current wires 27 and the voltage wires 28, as well as a tension relief in the form of e.g. a rope or a wire 29 which is firmly connected at both ends to the electrode indirectly through the hose 26 or by means of an outlet. This connection, which may be of any type, is not shown in FIG. 6. The electrode amplifier 30, whose importance has been described exhaustively above, is incorporated in the cavity of the electrode and is connected to the electrode 25 and the voltage wire 28, respectively, by means of an electric wire 31.

In a plurality of experiments performed in practice the traction vehicle used was a small tractor of the caterpillar type which had a width of 70 cm, a length of 120 cm and a height of 70 cm. The tractor was driven by a small petrol engine of 3.5 hp, and the above-mentioned electronic instruments were mounted on the tractor. The electrodes had a weight of 10–15 kg each and a length of about 35 cm with a diameter of about 10 cm, and the electrode configurations shown in FIGS. 4 and 5 were used. The tow was pulled through the terrain at a speed of 1.0–1.5 km/h, and this limit was set by the machine power of the traction vehicle so that it will be possible to work with greater speeds with a stronger towing means. The frequency used was 25 Hz and the current strength 10 milliamperes, the averaging time being 1 sec.

With a view to ascertaining the accuracy of the measurements which can be obtained by means of the method of the invention, comparative measurements with partly earth rods in a conventional Wenner configuration, partly the above-mentioned equipment were made over a distance of about 350 m. The electrode distance was 5 and 15 m, respectively, in both cases. An electrical main profile was measured with two meters between the measuring points by means of the traditional Wenner array with rod electrodes. The same distance was profiled with drag electrodes twice to and fro, and then an averaged main profile was calculated on the basis of the four profiles.

Figure 8:
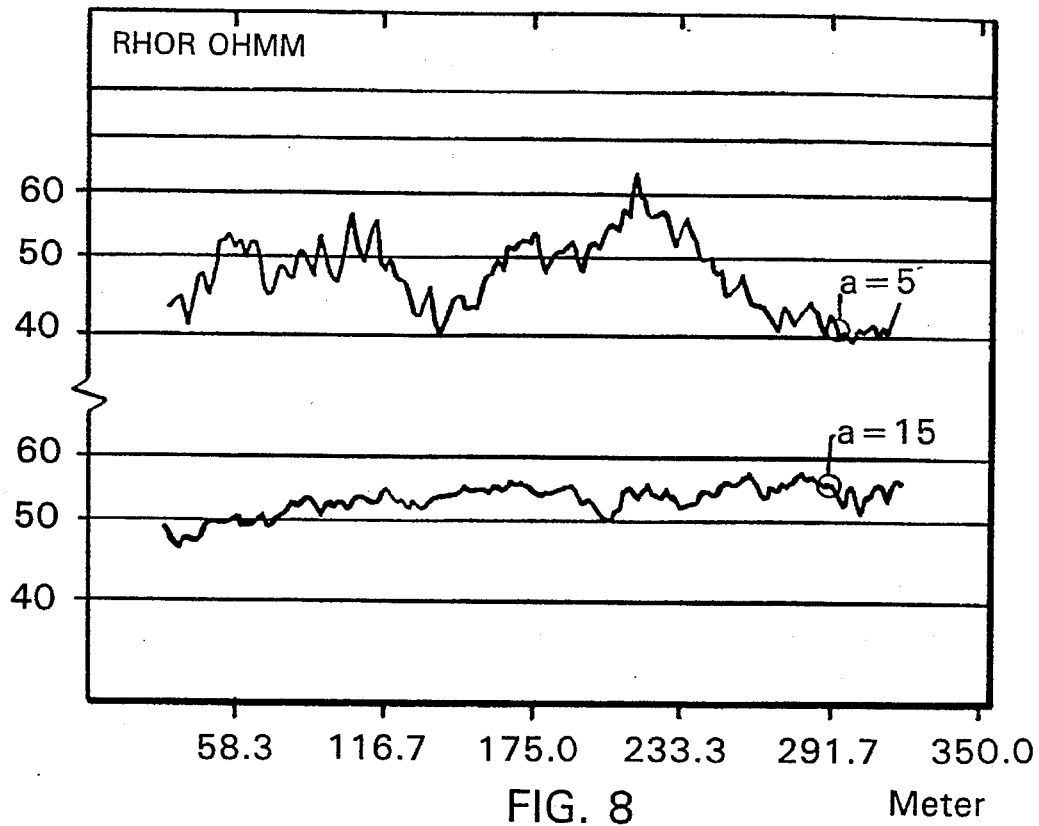
FIG. 8 is a diagram showing the apparent formation resistance measured in a traditional Wenner configuration with rod electrodes, with electrode distances of 5 and 15 m, respectively.
Figure 9:
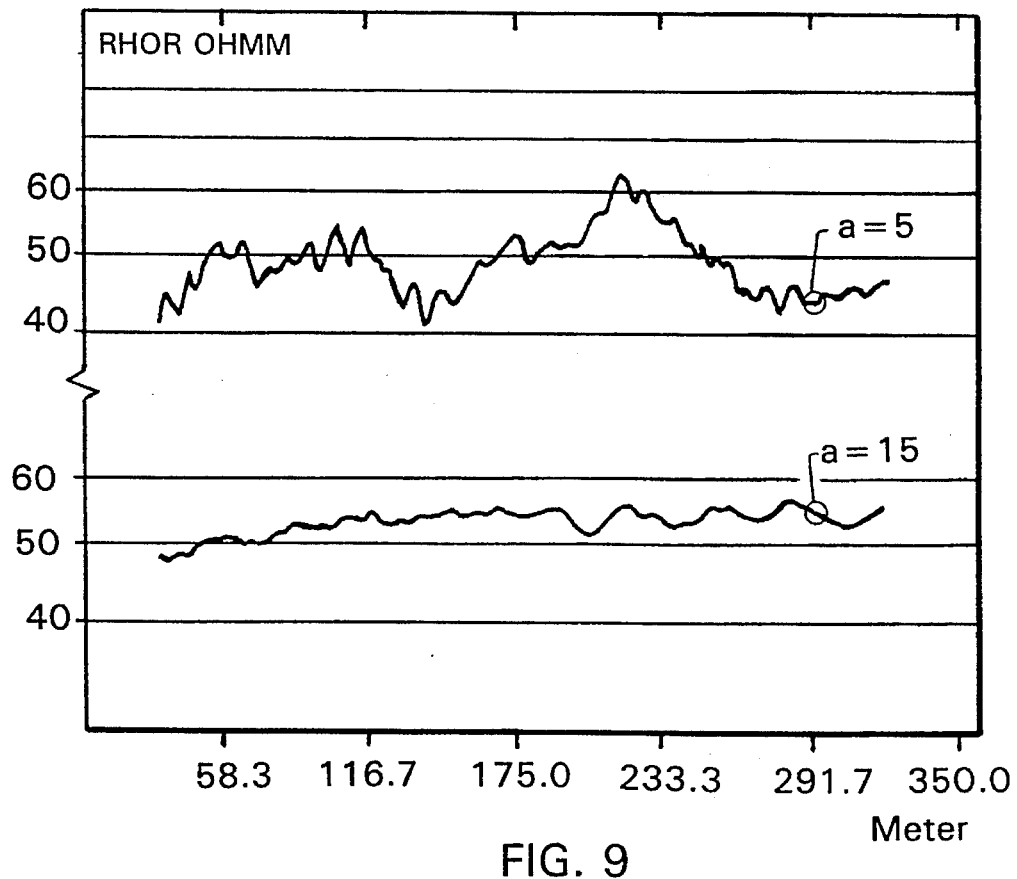
FIG. 9 shows the same, but with the measurements obtained by means of the measuring equipment of the invention.

The results of the measurements with earth rods are plotted in the diagram shown in FIG. 8, while the diagram in FIG. 9 shows the same measurements made by means of the equipment according to the invention.

As will be seen there is extremely good consistency between the results which are obtained by means of the two different methods, but the curves shown in FIG. 9, representing the measurements with the equipment according to the invention, have a somewhat "softer" course than the curves shown in FIG. 8 which represent the measurements made by means of earth rods. This insignificant different can be ascribed to the time averaging and thereby the local averaging of the measurement result in consequence of the movement of the electrodes. Thus, it may be established that electrical profiling by means of the equipment of the invention is just as accurate and reproducible for measuring the apparent electrical formation resistance as traditional electrical rod profiling. To this should be added that the method is much quicker and less labour intensive, and that the geological mapping can take place with a considerably greater level of detail than known before. This therefore opens up new possibilities of advantageously using electrical profiling for a variety of purposes, of which the following may be mentioned:

Mapping of deposits of natural resources, where electrical profiling has been used for many years, but where more detailed and regional explorations can now be made by means of the new equipment.

Geotechnical mapping in connection with road construction and building land to determine moist site areas, sand and clay localities.

Hydrogeological mappings, where the vulnerability of water magazines i.e. the homogeniety and extent of the clay cover layer, is to be described, and the more regional mapping of the geology where a hydrogeological model may be extrapolated and interpolated on the basis of the profiling results and point information.

Local mappings in connection with refuse dumps, where the same procedure may be used, as well as detailed mappings of the clay membrane in new refuse dumps.

I claim:

1. In an apparatus for mapping the subsurface geology in an earth formation by means of an electrical profiling operation, wherein the apparatus comprises at least one current circuit for passing current from a current source via current electrodes through a surface layer to be examined, and at least one voltage circuit with a measuring instrument for measuring via voltage electrodes a voltage signal generated by the current across the voltage electrodes, the improvement comprising:

a) a plurality of mobile current electrodes and a plurality of mobile voltage electrodes for dragging across the earth formation, each of said current and voltage electrodes having a generally smooth earth engaging surface;

b) means for mounting the current and voltage electrodes on a tow in a set configuration whereby the current and voltage electrodes can be towed in the set configuration from one place to another during the profiling operation; said means for mounting comprising respective wires running generally along the tow for connecting each of said current and voltage electrodes to the measuring instrument, each of said voltage electrodes having a single-ended electrode amplifier therein for simplifying the voltage signal so as to reduce interference between the voltage signal and other signals or current in the respective wires;

c) a generator for generating a train of current pulses;

d) filter means in the voltage circuit for isolating the voltage signal in phase with the current pulses whereby the measuring instrument can distinguish the voltage signal from noise signals.

2. An apparatus as claimed in claim 1 wherein each of the current and voltage electrodes weighs less than 100 kg.

3. An apparatus as claimed in claim 1 wherein each of the current and voltage electrodes weighs between 5 and 25 kg.

4. An apparatus as claimed in claim 3 wherein the generator generates current of a strength that does not exceed 10 milliamperes.

5. An apparatus as claimed in claim 3 wherein each of the current and voltage electrodes weighs between 10 and 15 kg.

6. An apparatus as claimed in claim 1 wherein the apparatus comprises a tow having at least first and second electrode configurations mounted thereon, with the first electrode configuration having a distance between electrodes which is different than the distance between electrodes of the second electrode configuration.

7. An apparatus as claimed in claim 1 wherein the apparatus comprises a bar for simultaneously towing a plurality of parallel tows.

8. An apparatus as claimed in claim 1 wherein the generator comprises means for limiting the strength of the current to 10 milliamperes or below.

9. An apparatus as claimed in claim 8 wherein the generator generates a pulse train having a frequency of between about 10 and 30 Hz.

10. An apparatus as claimed in claim 9 wherein the filter means comprises a phase lock and an averaging circuit.

11. An apparatus as claimed in claim 1, further comprising means for dragging the current and voltage electrodes through the earth formation.

12. An apparatus as claimed in claim 1, wherein the means for mounting includes means for arranging the electrodes in any of a plurality of configurations such that the voltage electrodes can be separated from one another any of a plurality of distances in the set configuration.

13. An apparatus as claimed in claim 12, wherein the voltage electrodes are separated from one another by a distance of between about 5 and 15 meters in the set configuration.

14. An apparatus as claimed in claim 1 wherein the generator has means for limiting the strength of the current to below 5 amperes.

15. In a method for mapping the subsurface geology in an earth formation wherein a generated current passes via current electrodes through a surface layer to be examined and generates a voltage signal across voltage electrodes situated in different points in the earth formation, and wherein the voltage signal is then measured, the improvement comprising:

a) generating the current as a pulse train;

b) amplifying the voltage signal with a single-ended amplifier within each of the voltage electrodes;

c) isolating the amplified voltage signal in phase with the pulse train; and d) dragging the current and voltage electrodes through the terrain and respectively measuring the isolated voltage signal, each of the current and voltage electrodes having a generally smooth earth engaging surface for minimizing resistance to obstacles in the earth formation during the dragging.

16. A method as claimed in claim 15 wherein the current is limited to a strength of about 10 milliamperes.

17. A method as claimed in claim 15 comprising:

a) measuring a first voltage signal across voltage electrodes situated in the earth formation on opposite sides of a center point, with each of the voltage electrodes being spaced a first distance from the center point, b) measuring a second voltage signal across voltage electrodes situated in the earth formation on opposite sides of the center point, with each of the voltage electrodes being spaced a second distance from the center point, said second distance being different from the first distance; and c) comparing the first and second voltage signals to profile the earth formation.

18. A method as claimed in claim 15 wherein the current is limited to a strength of below 5 amperes.

\* \* \* \* \*